C. W. WHALEY.
TROLLEY CIRCUIT CONNECTION.
APPLICATION FILED JULY 29, 1909.
979,116.
Patented Dec. 20, 1910.
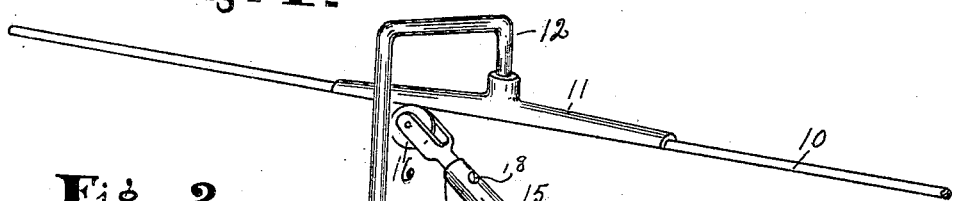
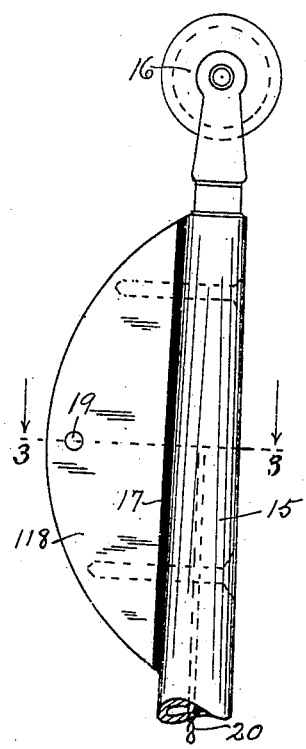
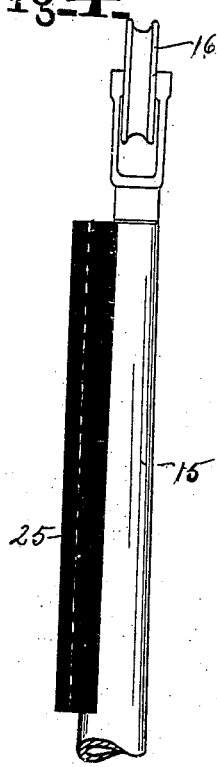
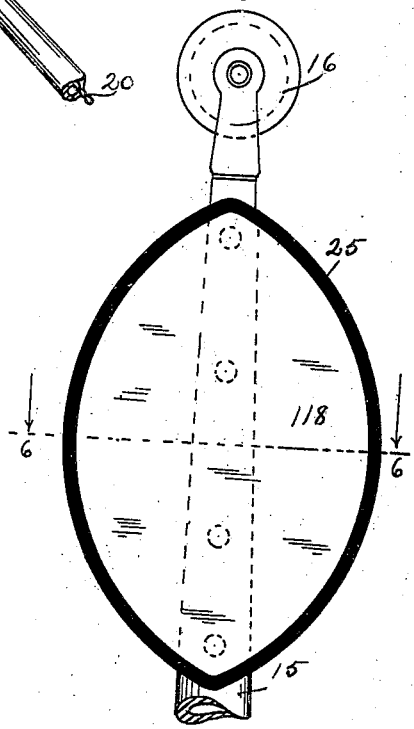
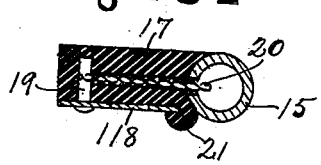
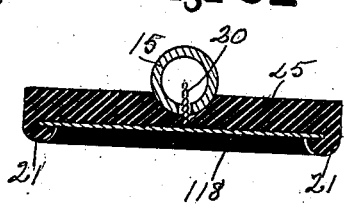
WITNESSES:
W. M. Gentle
O. M. McLaughlin
INVENTOR.
Charles W. Whaley.
BY
V. H. Lockwood
ATTORNEY.

UNITED STATES PATENT OFFICE.

CHARLES W. WHALEY, OF INDIANAPOLIS, INDIANA.

TROLLEY CIRCUIT CONNECTION.

979,116.  Specification of Letters Patent.  Patented Dec. 20, 1910.

Application filed July 29, 1909. Serial No. 510,298.

*To all whom it may concern:*

Be it known that I, CHARLES W. WHALEY, of Indianapolis, county of Marion, and State of Indiana, have invented a certain new and useful Trolley Circuit Connection; and I do hereby declare that the following is a full, clear, and exact description thereof, reference being had to the accompanying drawings, in which like letters refer to like parts.

The object of this invention is to provide improved means for diverting current from a trolley wire into a trolley car at intervals along the line, for operating an advertising or street indicating means, or the like, that may be located within the car.

The chief feature of the invention consists in combining with spring contacts on arms located at intervals along the trolley wire of a contact plate or terminal mounted on the trolley pole and provided with electrical connections running into the car, carried by the trolley pole, but insulated therefrom and arranged so that said contact plate or terminal on the trolley pole, when the trolley leaves the wire, cannot contact with the trolley wire. With devices of this kind there has been trouble arising from such contact with the trolley wire of the conductor running into the car to drive the advertising or street indicating means within and thus sending the current through said advertising or indicating means when not desired, so as to cause loss of current and injury to the mechanism of the advertising or street indicating means.

The nature of the invention will be understood from the accompanying drawings and the following description and claims:

In the drawings Figure 1 is a perspective view of a portion of a trolley wire and a trolley pole with the additional contact terminals mounted in connection therewith for establishing the circuit intermittently through advertising or street indicating means in the car. Fig. 2 is a side elevation of the upper part of a trolley pole with one contact terminal secured thereon. Fig. 3 is a section on the line 3—3 of Fig. 2, but on a smaller scale. Fig. 4 is a plan view of the upper part of the trolley pole. Fig. 5 is a side elevation of a modified form of a contact terminal on a trolley pole. Fig. 6 is a section across the same on the line 6—6.

In detail 10 represents a trolley wire on the upper side of which a plate 11 is secured that carries an arm 12, which extends laterally and downwardly to a point lower than the trolley wire, and from the lower end of said arm 12 a spring contact or terminal 13 extends inwardly to a point almost to the same vertical plane as the trolley wire. The contact 13 is arranged to spring laterally from its normal position if required.

The trolley pole 15 carries a trolley 16 on its upper end and is tubular, and to its underside a segmental disk or block 17, which is formed of rubber or other electrical non-conductor, is secured by the screws 18. The block is arranged longitudinally of the trolley pole, and directly under and on the side thereof next to the spring contact strip 13 there is a contact plate or terminal 118 secured. This plate covers the whole side of the block 17 and is in electrical contact with a pin 19 extending into the block into engagement with the wire or conductor 20 that runs through the block into the hollow portion of the trolley pole and down through the trolley pole to any mechanism in the car.

As the trolley pole moves along past the contact strip 13, the latter comes into engagement with the contact plate 118 that temporarily establishes a circuit through the conductor 20. To prevent the contact plate 118 from coming in contact with the trolley wire 10 if the trolley pole should escape from the trolley wire and spring upwardly, the block 17 is provided with a guard flange 21 extending for its full length along its upper edge. When a trolley pole escapes from the trolley wire, the guard flange 21 will come in engagement with the trolley wire and hold the trolley wire away from the plate 118, and since the plate 118 is not in electrical communication with the trolley pole, there is no chance for any circuit to be established through the conductor 20 excepting when done so by the contact strip 13.

In the modified form shown in Figs. 5 and 6 there is a block 25 substituted for the block 17 in the first form described. The block 25 is oval shaped and is centrally secured to one side of the trolley pole and has a contact plate 118 that is in electrical communication with the conductor 20. It has two flanges 21 all along its margin to protect the plate 118 from the trolley wire when the trolley pole escapes therefrom.

What I claim as my invention and desire to secure by Letters Patent is:

1. The combination of a trolley pole, a trolley wire, and an electrical contact secured thereto with a portion on a lower level than the trolley wire supported at one side of and extending horizontally toward the trolley pole, a vertically disposed contact plate mounted in connection with the trolley pole so as to be engaged by said horizontal portion of the electrical contact connected with the trolley wire, a conductor extending from said contact plate through the trolley pole, and a laterally extending guard flange extending along said contact plate for preventing said contact plate from coming in contact with the trolley wire when the trolley pole escapes therefrom.

2. The combination of a trolley pole, a trolley wire, and an electrical contact secured thereto with a spring portion on a lower level than the trolley wire supported at one side of and extending horizontally toward the trolley pole, a vertically disposed block formed of non-conducting material secured to the trolley pole, a contact plate secured to the side of said block in position to be engaged by the spring portion of said electrical contact which is mounted in connection with the trolley wire, an electrical connection from said contact plate extending through said block and the trolley pole, and a flange on said block extending laterally beyond said contact plate, substantially as and for the purpose set forth.

In witness whereof, I have hereunto affixed my signature in the presence of the witnesses herein named.

CHARLES W. WHALEY.

Witnesses:
G. H. BOINK,
O. M. McLAUGHLIN.